United States Patent
Aono et al.

[11] Patent Number: 5,808,311
[45] Date of Patent: Sep. 15, 1998

[54] METHOD FOR DETECTING DISPLACEMENT OF ATOMS ON MATERIAL SURFACE AND METHOD FOR LOCAL SUPPLY OF HETEROATOMS

[75] Inventors: Masakazu Aono, Kanagawa; Francois Grey, Ibaraki; Ataru Kobayashi, Ibaraki; Eric Snyder, Ibaraki; Hironaga Uchida, Ibaraki; Dehuan Huang, Ibaraki; Hiromi Kuramochi, Tokyo, all of Japan

[73] Assignee: Research Development Corporation of Japan, Saitama, Japan

[21] Appl. No.: 491,484

[22] Filed: Jun. 16, 1995

[30] Foreign Application Priority Data

Jun. 16, 1994 [JP] Japan .................................. 6-134641
Jun. 20, 1994 [JP] Japan .................................. 6-137669

[51] Int. Cl.$^6$ ...................................................... H01J 37/30
[52] U.S. Cl. ....................................... 250/452.2; 250/307
[58] Field of Search ................................... 250/306, 307, 250/492.2, 492.3

[56] References Cited

U.S. PATENT DOCUMENTS

| | | | |
|---|---|---|---|
| 4,987,312 | 1/1991 | Eigler | 250/492.2 |
| 5,043,578 | 8/1991 | Guethner et al. | 250/492.2 |
| 5,166,919 | 11/1992 | Eigler | 250/492.3 |
| 5,397,420 | 3/1995 | Sakakibara et al. | 250/492.2 |
| 5,416,331 | 5/1995 | Ichikawa et al. | 250/492.2 |
| 5,440,122 | 8/1995 | Yasutake | 250/492.2 |
| 5,471,064 | 11/1995 | Koyanagi et al. | 250/492.2 |
| 5,489,339 | 2/1996 | Hattori | 250/492.2 |

OTHER PUBLICATIONS

"Surface Studies by Scanning Tunneling Microscopy", G. Binning et al., The American Physical Society, Physical Review Letters, vol. 49, No. 1., pp. 57–61, Apr. 30, 1982.

"Nanometer Lithography with the Scanning Tunneling Microscope", M. Ringger et al., American Institute of Physics, Appl. Phys. Letter 46, pp. 832–834, May 1, 1985.

"Surface Diffusion of Oxygen Atoms Individually Observed by STM", G. Binning et al., IBM Zurich Research Laboratory, Surface Science 169, pp. L295–L300, 1986.

"Nanometer Scale Structure Fabrication with the Scanning Tunneling Microscope", U. Staufer et al., American Institute of Physics, Appl. Phys. Letter 51, pp. 244–246, Jul. 27, 1987.

"Transition from the Tunneling Regime to Point Contact Studies Using Scanning Tunneling Microscopy", J. K. Gimzewski et al. The American Physical Society, Physical Review B, vol. 36, No. 2, pp. 1284–1287, Jul. 15, 1987.

"Atomic–Scale Surface Modifications Using a Tunneling Microscope", R.S. Becker et al., AT&T Bell Laboratories, Letters to Nature, vol. 325, pp. 419–421, Jan. 29, 1987.

(List continued on next page.)

Primary Examiner—Bruce Anderson
Attorney, Agent, or Firm—Wenderoth, Lind & Ponack

[57] ABSTRACT

Atomic displacement on a material surface is detected by, in a system comprising the tip of a scanning tunneling microscope (STM) and a material in question, upon an atomic displacement operation comprising extraction of atoms on the material surface and adsorption of atoms onto the material surface through application of a pulse voltage to the tip of STM, measuring a z-piezo voltage along the time series during and after application of the pulse voltage. Furthermore, heteroatoms dissociated by a reaction between the tip surface of STM and heteromolecules in a heteromolecular atmosphere are stored on the surface of the tip of STM, and then, heteroatoms are locally adsorbed onto the material surface by causing electro-evaporation of the heteroatoms through application of a prescribed scanning voltage to the tip of STM.

4 Claims, 8 Drawing Sheets

OTHER PUBLICATIONS

"Characterization of Gold Surfaces for Use as Substrates in Scanning Tunneling Microscopy Studies", R. Emch et al., American Institute of Physics, J. Appl. Phys. 65, pp. 79–84, Jan. 1, 1989.

"Writing Nanometer–Scale Symbols in Gold Using the Scanning Tunneling Microscope", Y.Z. Li et al., American Institute of Physics, Appl. Phys. Letter 54, pp. 1424–1426, Apr. 10, 1989.

"Atomic Emission from a Gold Scanning–Tunneling Microscope Tip", H.J. Mamin et al., The American Physical Society, Physical Review Letters, vol. 65, No. 19, pp. 2418–2421, Nov. 5, 1990.

"Atomic and Molecular Manipulation with the Scanning Tunneling Microscope", J.A. Stroscio et al., IBM Research Division, Science, vol. 254, pp. 1319–1326, Nov. 29, 1991.

"Field–Induced Nanometer to Atomic–Scale Manipulation of Silicon Surfaces with the STM", In–Whan Lyo et al., IBM Research Division, Science, vol. 253, pp. 173–176, Jul. 12, 1991.

"Atomic Sites of a Bare Surface Modified with the Tunneling Microscope", H. Fuchs et al., Advanced Materials, Adv. Mater. 3, No. 2, pp. 112–113, 1991.

"Tailoring Nanostructures with a Scanning Tunneling Microscope", U. Staufer et al., American Vacuum Society, J. Vac. Sci. Technol. B9 (2), pp. 1389–1393, Mar./Apr. 1991, "An Atomic Switch Realized with the Scanning Tunneling Microscope", Nature, Letters to Nature vol. 352, pp. 600–603, Aug. 15, 1991.

"Surface Modification of $MoS_2$ Using an STM", Shigeyuki Hosoki et al., Applied Surface Science, vol. 60/61, pp. 643–647, 1992.

"Fabrication of Atomic–Scale Structures on Si(111)–7×7 Using a Scanning Tunneling Microscope (STM)", Dehuan Huang et al., American Institute of Physics, Jpn.J.Appl.Phys. vol. 31, Part 1, No. 12B, pp. 4501–4503, Dec. 1992.

"Site–Specific Measurement of Adatom Binding Energy Differences by Atom Extraction with the STM", Hironaga Uchida et al., The American Physical Society, Physical Review Letters, vol. 70, No. 13, pp. 2040–2043, Mar. 29, 1993.

"Formation of Nanometer–Scale Grooves in Silicon with a Scanning Tunneling Microscope", A. Kobayashi et al., Science, Reports, vol. 259, pp. 1724–1726, Mar. 19, 1993.

METHOD FOR DETECTING DISPLACEMENT OF ATOMS ON MATERIAL SURFACE AND METHOD FOR LOCAL SUPPLY OF HETEROATOMS

FIELD OF THE INVENTION

The present invention relates to a method for detecting the displacement of atoms on a material surface and method for a local supply of heteroatoms. More particularly, the present invention relates to a method for detecting the displacement of STM atoms on a material surface and a method for local supply of heteroatoms, which are useful for creating atomic modification substances such as an atomic-scale modification materials and atomic-scale modification device.

PRIOR ART

Along with the progress of high technology including electronics and biotechnology, active efforts have been made to develop new materials of higher functions and higher performance and applications thereof.

In the area of development and offer of such new materials, atomic-scale manipulation of the surface of the substance in question is an important task, and through the supply of heteroatoms onto the material surface, it is expected to modify original properties of the substance in question and develop new materials having higher functions and higher performance as well as new properties.

The known technologies associated with manipulation of atoms on the material surface include, in general, the vacuum deposition method, the ion vapor deposition method, the molecular-beam epitaxy (MBE) method, the chemical vapor deposition (CVD) method, and the vapor etching method.

These methods comprise forming a film with heteroatoms on a substrate of the material in vacuum, or removing surface atoms by etching, and are now commonly utilized.

For example, the molecular-beam epitaxy (MBE) method is known as a technology for preparing a single-crystal thin film of a semiconductor, a metal or a dielectric. In this method, molecular beams generated by heating a Knudsen cell (vapor source cell) interact with a heated single-crystal substrate, whereby a single-crystal thin film is formed. This method permits control of the thickness of the order of a single atomic layer, interface steepness and large-area uniformity.

The vapor etching is a method comprising surface chemical reactions caused by ions or radicals as its steps, and permits atomic-layer-scale extraction and elimination.

More recently, a new method known as the liquid metal ion source (LMIS) was developed, which enables the formation of an atomic layer by discharging from a needle tip a molten liquid metal as ions through application of electric potential to the electrode opposite to the needle.

Many studies and contrivances have on the other hand been made about methods for supplying heteroatoms onto the material surface. Particularly, chemical vapor deposition (CVD) is a method for preparing a thin film, which comprises chemical reactions as its steps, in which the growth process general of substances proceeds through chemical reactions. In addition to the remarkable features of the above-mentioned MBE method including film forming control of a thickness of the order of an atomic layer, interface steepness and large-area uniformity, therefore, the CVD method also permits precise chemical composition control. All these conventional vapor methods have a common feature of supplying heteroatoms to spontaneously broken portions on the material surface.

In contrast to the conventional method for supplying heteroatoms to the spontaneously broken portion on the material surface, too, a new method using a liquid metal ion source (LMIS) has more recently been developed. This method for supplying heteroatoms onto the material surface using LMIS comprises ionizing a molten liquid metal by applying an electric potential to an electrode opposite to the needle, and releasing the resultant ions from the tip of the needle. This method now allows achievement of new materials having precise composition controllability.

In these conventional methods, however, while it is to some extent possible to achieve atomic-layer-scale controllability, interface steepness and large-area uniformity, it is difficult to precisely manipulate a local region of the material surface in an atomic scale. These methods are not therefore practicable as techniques to manipulate and control the material surface on an atomic level which is indispensable for the preparation of new materials and devices hereafter. Furthermore, it is impossible to selectively supply heteroatoms to a local portion on the material surface. Consequently, it is impossible to control the material surface on an atomic level, which is essential for the preparation of new materials and devices hereafter.

More recently, a method for controlling the extraction of atoms of the material surface on an atomic level and adsorption of atoms to the surface, so far considered impossible, has been proposed by the present inventors.

The proposed method comprises the steps of applying a voltage to the tip of a scanning tunneling microscope (STM), locally extracting atoms of the material surface, and causing local adsorption of atoms.

This process for locally manipulating atoms attracts the general attention as a novel epoch-making atom manipulating method. For the perfection in practice, however, there still remain many problems to be solved. One of these problems is that it is necessary to establish a method for detecting the status regarding extraction and adsorption of atoms, i.e., displacement of atoms. Establishment of this detecting method is very important with a view to strictly analyzing the process of local atom manipulation in the creation of atomic-scale modification materials and atomic-scale modification devices hereafter, and of achieving technical progress.

The present invention was developed in view of the background as described above, and has an object to provide a novel method for detecting displacement of atoms on the material surface and a method for local supply of heteroatoms, which solves the drawbacks of the prior art, on the basis of the STM technique, and allows atomic-scale control of the material surface, which is indispensable for the preparation of new materials and devices hereafter.

SUMMARY OF THE INVENTION

The present invention provides a method for detecting displacement of atoms on the surface of a material, which, in a system comprising the tip of a scanning tunneling microscope (STM) and the material in question, upon atomic displacement action for extraction of atoms on the surface of the material and adsorption of atoms to the surface of the material through application of a pulse voltage onto the tip of the STM, comprises measuring z-piezo voltage during application of the pulse voltage and after application of the pulse voltage along the time series.

The present invention further provides a method for local supply of heteroatoms onto the material surface, which, in a system comprising the micro tip of a scanning tunneling microscope (STM), a material in question, and a heteromolecule relative to the tip and the material, comprises storing heteroatoms dissociated through reaction between the tip surface and the heteromolecule in a heteromolecular atmosphere on the surface of the tip, and then, applying a prescribed scanning voltage to the tip to electro-evaporate the heteroatoms, thereby causing adsorption of the heteroatoms onto the material surface.

DETAILED DESCRIPTION OF THE INVENTION

In the present invention, extraction of atoms from the surface can be confirmed as a decrease in the distance between the STM tip and the surface of the material in question, and adsorption of atoms onto the surface, as an increase in this distance, both caused by changes in z-piezo voltage from measurement with time of z-piezo voltage as described above.

In the present invention, furthermore, it is possible to locally supply heteroatoms onto the surface of the material serving as the sample, by storing the heteroatoms in the STM tip to conduce electro-evaporation by the utilization of the surface reaction of the STM tip. In this case, the system comprising the tip of the scanning tunneling microscope (STM), the material in question, and the heteromolecules against the tip and the material can be configured in a container such as a chamber.

Figures 1A, 1B, 1C, 1D:
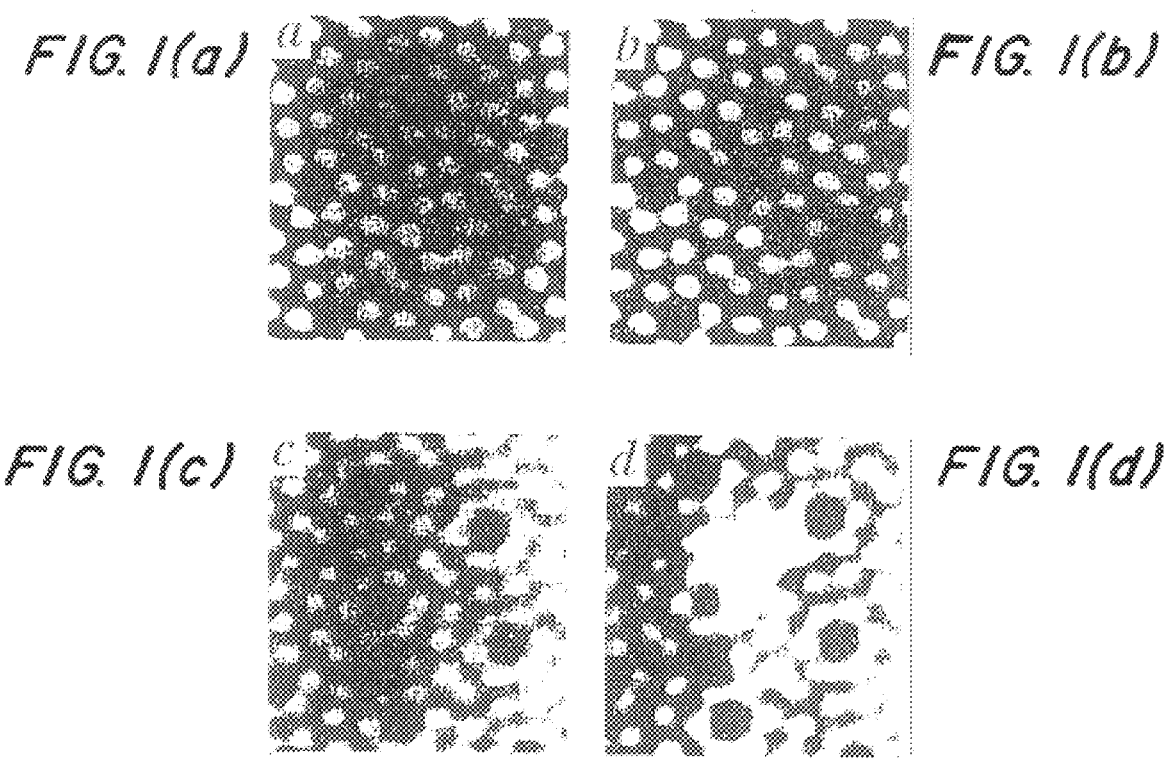
FIGS. 1(a), (b), (c) and (d) are photographs illustrating the status of the surfaces of materials relating to local adsorption and extraction of atoms.

For example, FIG. 1 is an STM image illustrating the surface before and after application of a pulse voltage in a P-doped n-type silicon sample. FIG. 1(a) shows the silicon surface before extraction of atoms prior to applying a pulse voltage; FIG. 1(b) shows the silicon surface from which atoms have been extracted after application of the pulse voltage; FIG. 1(c) shows the silicon surface before adsorption of atoms; and FIG. 1(d) shows the silicon surface after adsorption of atoms. It is thus possible to confirm extraction from the surface or adsorption to the surface as displacement of an atom or a cluster of a plurality of atoms, and it is easier now to modify the material surface and create the material itself by artificially reproducing this process.

FIG. 2 is a conceptual view illustrating the principle of the method for local supply of heteroatoms to the material surface of the present invention.

Figure 2A:
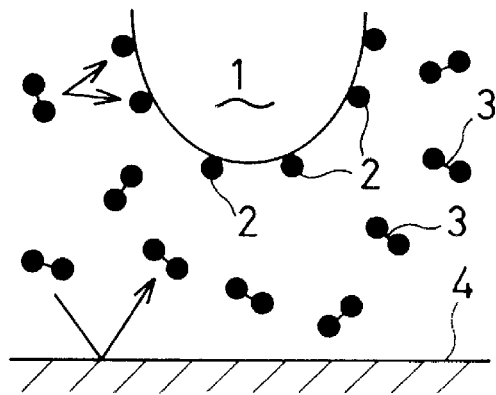
FIGS. 2(a) and (b) are schematic views illustrating part of the principle of the present invention.

As shown in FIG. 2(a), hoteroatoms (2) relative to the material in question are stored in the STM tip (1). This method comprises the steps of using the interior of a container such as a chamber as an atmosphere for the heteromolecules, dissociating heteromolecules by means of a surface chemical reaction with the STM tip (1) into an atomic state, causing the surface thereof to adsorb the heteroatoms (2), and storing heteroatoms (2) on the surface of the STM tip (1). While the case shown in this drawing represents two-atom heteromolecules, the heteromolecule (3) in the present invention is not limited to a diatomic molecule.

Figure 2B:
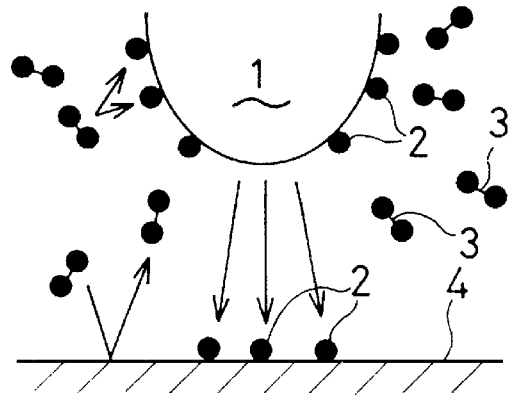

Then, as shown in FIG. 2(b), a scanning voltage is applied to the STM tip (1) to cause electro-evaporation of the heteroatoms (2) stored on the surface of the STM tip (1). The electro-evaporated heteroatoms (2) are locally adsorbed on the surface of the material (4).

Figure 3A:
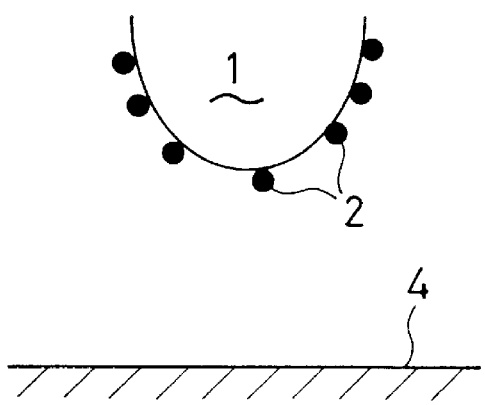
FIGS. 3(a) and (b) are schematic view illustrating part of the principle of the present invention.

In the present invention, furthermore, as shown in FIG. 3 for example, the heteroatoms (2) may be previously adsorbed in a heteromolecular atmosphere on the STM tip (1) so as to cause electro-evaporation of the heteroatoms (2) in a state in which the heteromolecular atmosphere is evacuated.

Figure 3B:
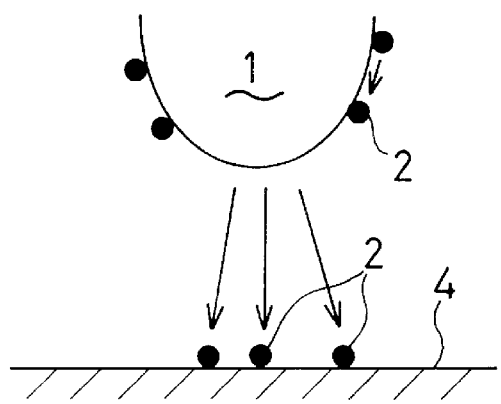

As shown in FIG. 3(b) for example, a prescribed scanning voltage is applied onto the STM tip (1) to cause electro-evaporation of the heteroatoms (2) stored on the surface of the STM tip (1), and the electro-evaporated heteroatoms (2) are locally adsorbed onto the surface of the material (4).

In these methods, the kind of the material in question and the kind of the STM tip may be arbitrarily selected, and with the use of the heteroatoms different from the material, it would be possible also to conduct adsorption of these atoms onto the material surface and extraction thereof and to determine the process and the result. For example, the method using hydrogen as the heteroatoms (molecules) attracts general attention as a control technique of surface condition of a semiconductor substrate.

There is no particular limitation on the scanning voltage of the tip: it is appropriately selected, depending upon the material of the STM tip, the kind of heteromolecules, and the degree of vacuum.

Now, the present invention is described in further detail by means of examples.

EXAMPLE 1

An Si (111) substrate having dimensions of 15×7×0.3 mm$^3$ was cut from a P-doped n-type silicon wafer (0.1 Ωcm) and attached to the sample holder of a scanning tunneling microscope (JEOL JSTM-4000 XV). This holder was surface cleaned by heating to 1,200° C. in an extra vacuum chamber under a degree of vacuum of $1\times10^{-8}$ Pa.

A 0.1 mm single-crystal W wire was used for the tip of STM, and the tip was etched in a 0.5N KOH solution.

Then, a sample bias voltage of +2 V was applied. At this point, tunneling current was 0.6 nA. The tip of STM was moved to a position previously set, and a pulse voltage of −5.5 V was applied for 30 ms. The surface condition before and after application of pulse voltage is shown in FIG. 1.

In this operation, z-piezo voltage and tunneling current were evaluated by which a two-channel digital oscilloscope (made by Phillip Company; PM3323) provided with four memory buffers was connected to a computer.

Figure 4A:
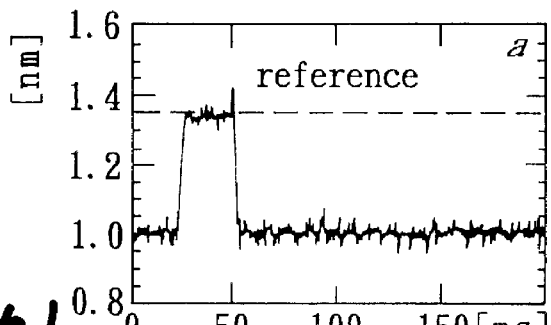
FIGS. 4(a), (b), (c), (d) and (e) are graphs each illustrating the relationship between the distance from the STM tip to the silicon surface, namely tip height(nm) and the time(ms)
Figure 4B:
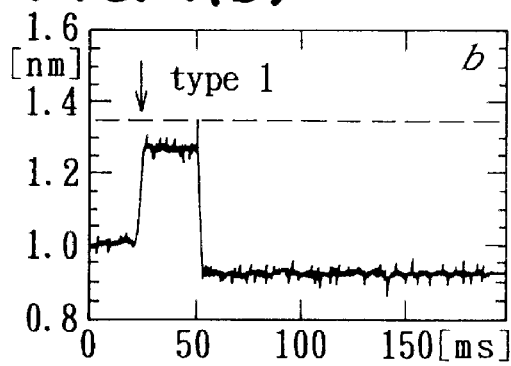
Figure 4C:
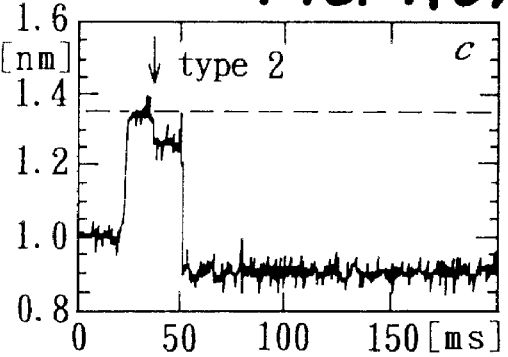
Figure 4D:
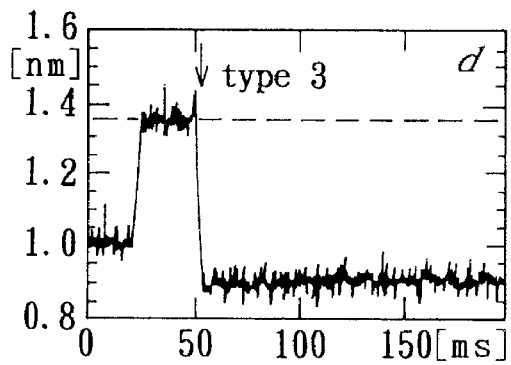
Figure 4E:
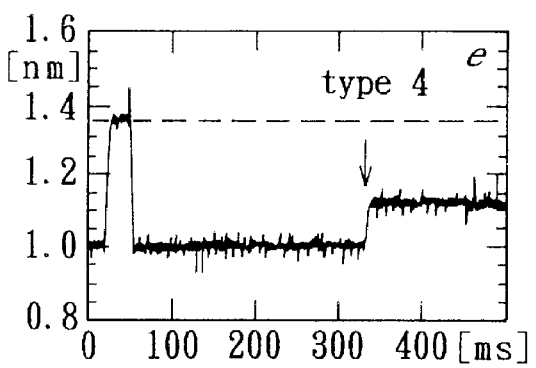

First, in the case where a pulse voltage was applied, and there occurred no displacement of atoms resulting from extration or adsorption, the distance between the STM tip and the silicon surface was measured along the time series as a z-piezo voltage. The result is as shown in FIG. 4(a). In this FIG. 4(a), the distance between the STM tip and the silicon surface, which depends upon change in the z-piezo voltage, can be determined by measuring the z-piezo voltage. As is clear from FIG. 4(a), in the absence of atomic displacement, application of a pulse voltage causes an increase in the distance between the STM tip and the silicon surface to about 0.35 nm.

Application of a pulse voltage of −5.5 V and measurement of the distance between the STM tip and the silicon surface give results, for example, as shown in FIGS. 4(b) to (e). These graphs show changes in the distance between the STM tip and the silicon surface along the time series. As shown in these graphs, four different results were obtained.

<b: Type 1> As compared with FIG. 4(a), the difference occurs immediately after application of the pulse voltage. This case is referred to as Type 1. In this Type 1, application of the pulse voltage leads to a decrease in the distance between the STM tip and the silicon surface, and the distance between the STM tip and the silicon surface is shorter after application of the pulse voltage than before application.

<c: Type 2> As compared with FIG. 4(a), a difference occurs during application of the pulse voltage. This case is referred to as Type 2. In this Type 2, the distance between the STM tip and the silicon surface decreases during application of the pulse voltage, and, the distance between the STM tip and the silicon surface is also shorter after application of the pulse voltage than before application thereof.

<d: Type 3> As compared with FIG. 4(a), this difference occurs immediately after the completion of application of the pulse voltage. This case is referred to as Type 3. In this Type 3, too, the distance between the STM tip and the silicon surface is after application of the pulse voltage.

<e: Type 4> As compared with FIG. 4(a), this difference occurs after a while from the completion of application of the pulse voltage. This case is referred to as Type 4. In this Type 4, the distance between the STM tip and the silicon surface is larger after a while from the completion of application of the pulse voltage than before application.

Figure 5:
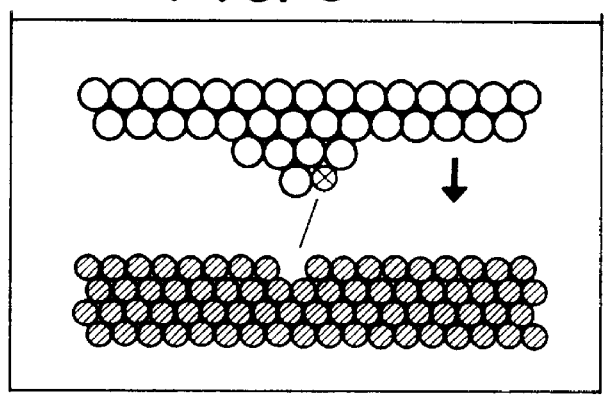
FIG. 5 is a schematic view illustrating conditions of the material surfaces in the cases shown in FIGS. 2(b), (c) and (d)
Figure 6:
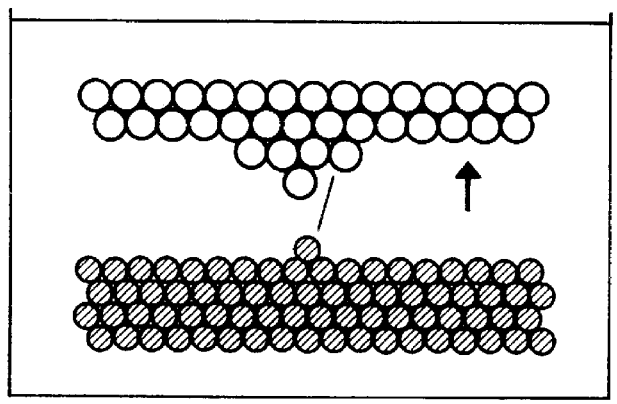
FIG. 6 is a schematic view illustrating conditions of the material surface in the case shown in FIG. 2(e)

Comparison of these Types reveals that silicon atoms of the silicon surface are extracted by the STM tip as illustrated in FIG. 5. In Type 4, as shown in FIG. 6, it is suggested that silicon atoms on the STM tip have been adsorbed on the silicon surface. The correlation we observe between the direction of tip motion and the type of modification (deposition or extraction)makes sense in terms of a simple model. If the Si atom under the tip is removed from the tunnel junction when it is extracted, the distance between tip and sample increase, and therefore so does the tunnel junction resistance. As a result the current should decrease briefly as the tip moves towards the sample to restore the same tunnel current. The opposite is true if an atom from the tip is deposited exactly at the tunnel junction. And the difference between types is shown by the progress with time.

Figure 7:
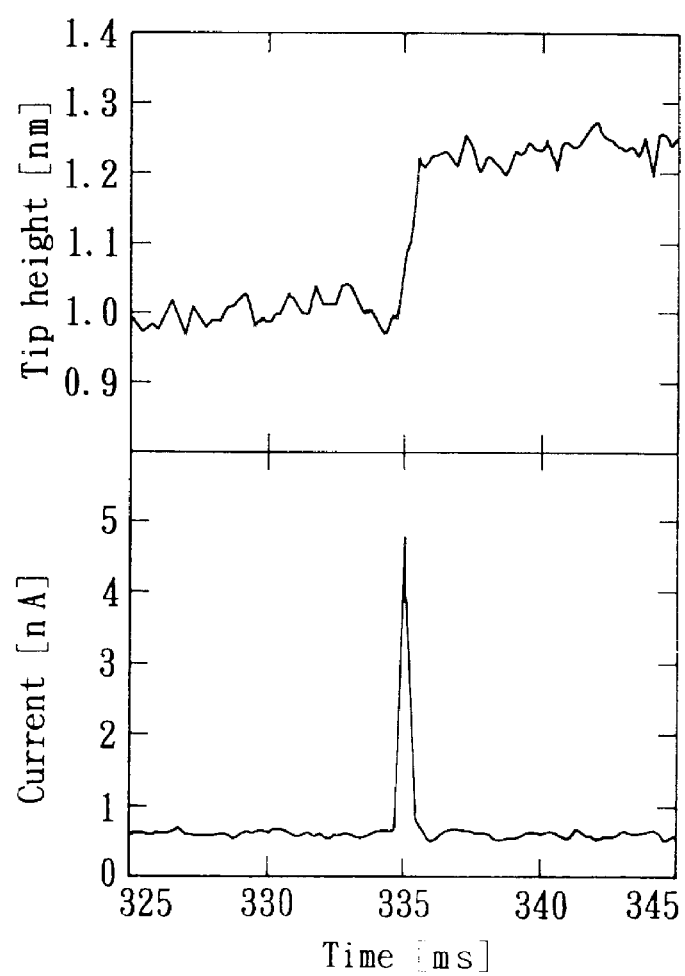
FIG. 7 is a graph illustrating measured values of the distance between the STM tip and the silicon surface, namely tip height(nm) in the case shown in FIG. 2(e), together with occurrence of pulse tunnel current.

FIG. 7 shows, for Type 4 described above, the distance measured from the z-piezo voltage upon adsorption of atoms when the distance between the STM tip and the silicon surface is larger, and generation of pulse tunneling current at this point.

Figure 8:
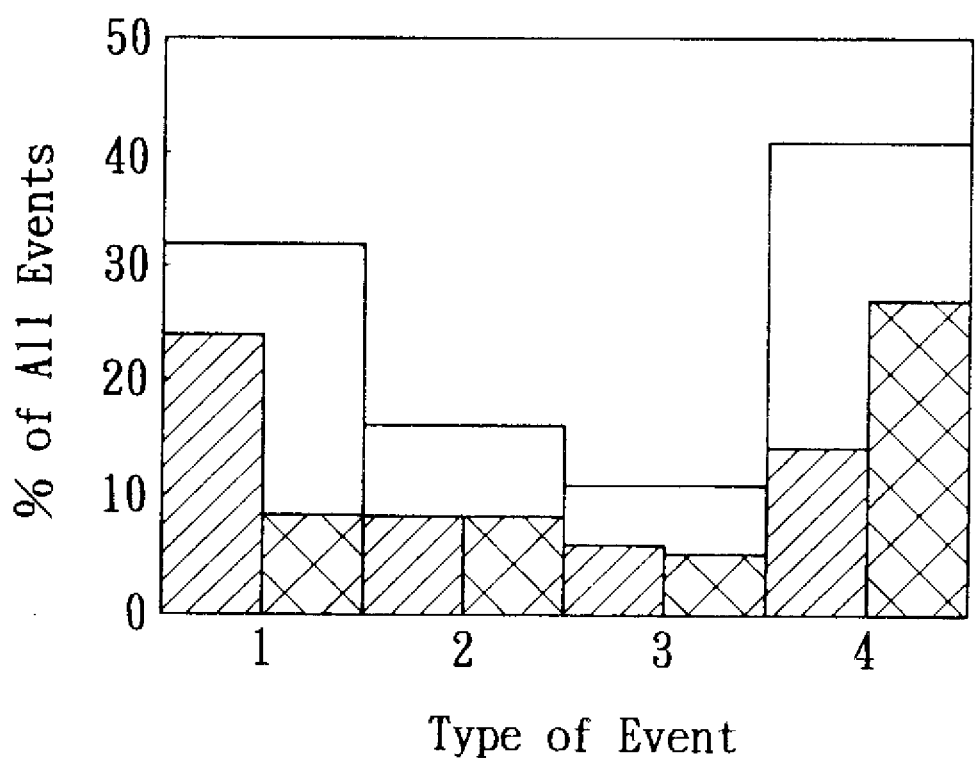
FIG. 8 is a graph illustrating the ratio of occurrence of each of the types 1 to 4 in the case of bringing the tip loser and in the case of bringing the tip farther in 242 runs of application.

FIG. 8 shows the distribution of ratios of occurrence of the above-mentioned Types 1 to 4 through 242 runs of operation. The portion shadowed with single oblique lines represents the case where the STM tip is brought closer to the silicon surface, and the portion shadowed with crossed oblique lines represents the case where the STM tip is brought farther. In this Example, Type 1 extraction of atoms onto the silicon surface mainly occurs when bringing closer, and Type 4 adsorption of atoms from the silicon surface mainly occurs when bringing farther.

EXAMPLE 2

An Si (111) substrate of dimensions of $15\times7\times0.3$ mm³ was cut from a P-doped n-type silicon wafer (0.1 Ω cm), and was attached to the sample holder of a scanning tunneling microscope (JEOL JSTM-4000XV) in high vacuum state of about $6\times10^{-11}$ Torr.

The sample was repeatedly heated to 1,200° C. under a degree of vacuum of at least $1\times10^{-10}$ Torr, and the silicon structure was brought to 7×7.

Platinum containing 20% iridium was used for the STM Tip.

For this Si(111)–7×7 sample, changes in the sample surface were observed from STM images, with the use of this STM tip, under the high vacuum conditions of $6\times10^{-11}$ Torr as described above in $H_2$ atmosphere of $1\times10^{-7}$ Torr, for the individual cases.

More specifically, disregarding the effect of hydrogen molecule $H_2$, the surface of this Si(111)–7×7 was scanned with the platinum tip under a high vacuum of $6\times10^{-11}$ Torr. The scanning time was 195 nm/s, and the number of scanning lines was 512.

Figure 9A:
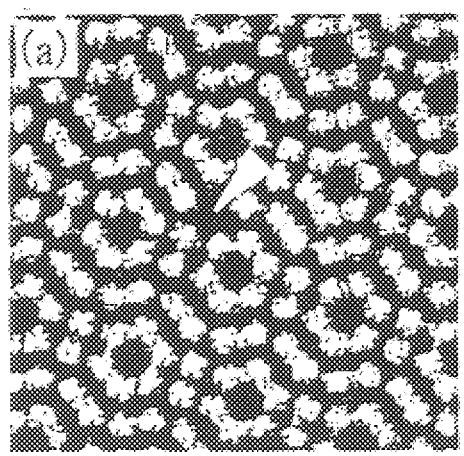
FIGS. 9(a) and (b) are photographs, comprising STM images illustrating conditions of the material surface as embodiments of the present invention.
Figure 9B:
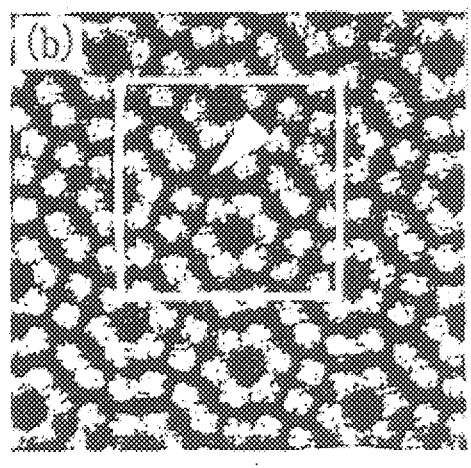

In usual scanning, the silicon surface was as shown in FIG. 9(a), and in similar sample bias with a scanning voltage of +3.5 V, the silicon surface was as shown in FIG. 9(b). FIGS. 9(a) and (b) show 10×10 nm² regions, and the square box in FIG. (b) represents a 5×5 nm² region of platinum needle scanning. The arrow in FIG. 9(a) and (b) show spontaneous loss of silicon atoms on the silicon surface. In all these cases, the sample bias voltage was +1.0 V, and the tunneling current was 0.6 nA.

To Comparison of FIGS. 9(a) and (b) reveals that there is no marked difference between the two cases. This suggests that, when the effect of hydrogen molecule $H_2$ is disregarded, there is no difference in the surface condition.

Then, hydrogen molecule $H_2$ was supplied into the chamber to observe the effect on an STM image in hydrogen molecule atmosphere of $1\times10^{-7}$ Torr.

Figure 10A:
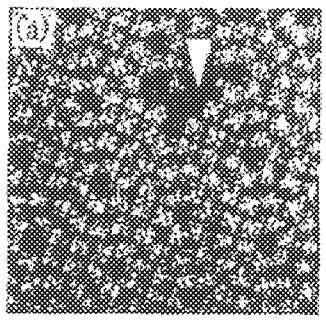
FIGS. 10(a), (b) and (c) are photographs, comprising STM images illustrating conditions of the material surface as other embodiments of the present invention.
Figure 10B:
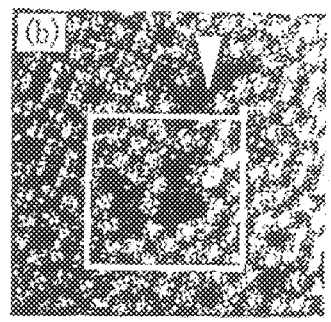

The results were as shown in FIG. 10. FIG. 10(a) shows the state before scanning, and FIGS. 10(b) and (c) represent the state after scanning with a scanning voltage of +3.5 V.

Figure 10C:
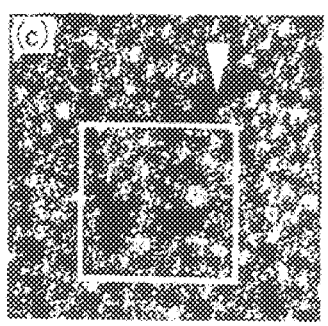

In FIGS. 10(a) and (b), the sample bias voltage was +1.0 V, and in FIG. 10(c), the sample bias voltage was −1.0 V.

When comparing FIG. 10(a) and FIG. 10(b) with regard to the center square box and the left bottom portion of the arrow, FIG. 10(b) is far thicker than FIG. 10(a). Similarly, when comparing FIG. 10(a) and FIG. 10(c) with regard to the center square box and the left bottom portion of the arrow, FIG. 10(c) is far thicker than FIG. 10(a).

Hydrogen atoms H are adsorbed in this portion.

EXAMPLE 3

Then, hydrogen atoms H had previously been deposited onto the tip of a platinum tip, and then, hydrogen atoms were caused to be adsorbed under a vacuum condition without supplying hydrogen molecules into the chamber.

Figure 11A:
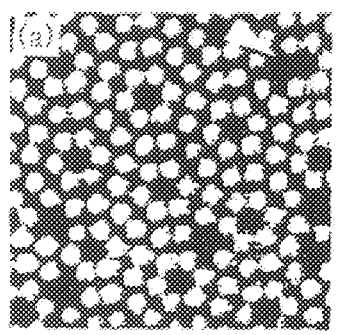
FIGS. 11(a), (b) and (c) are photographs, comprising STM images illustrating conditions of the material surface as further embodiments of the present invention.

More specifically, hydrogen molecules $H_2$ were previously supplied continuously into the chamber, dissociated under vacuum of 90 L (L=1×10$^{-6}$ Torr.s), and hydrogen atoms H were deposited onto the surface of the platinum STM tip. Then, the chamber was evacuated by discontinuing the supply of hydrogen molecules $H_2$. The scanning voltage was brought to +3.5 V in vacuum to cause adsorption of hydrogen atoms on the platinum STM tip onto the silicon surface. FIG. 11(a) shows the surface condition of the material in question before scanning, and FIGS. 11(b) and (c) show the surface condition of the material after scanning with a voltage of +3.5 V. In FIGS. 11(a) and (b), the sample bias voltage was +1.0 V, and in FIG. 11(c), the sample bias voltage was -1.0V.

Figure 11B:
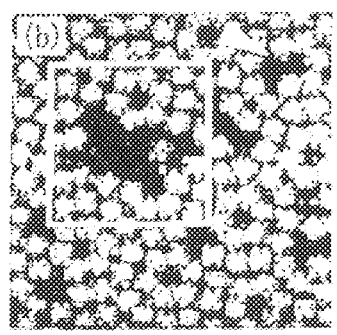
Figure 11C:
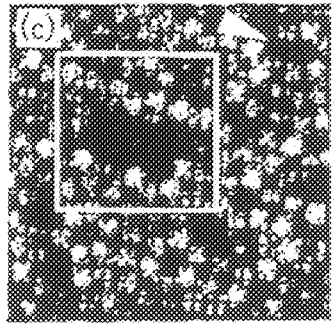

When comparing FIGS. 11(a) and (b) with regard to the center square box and the left bottom portion of the arrow, FIG. 11(b) is far thicker than FIG. 11(a). Similarly, when comparing FIG. 11(a) and FIG. 11(c), for example, with regard to the center square box and the left bottom-portion of the arrow, FIG. 11(c) is far thicker than FIG. 11(a).

Hydrogen atoms H are adsorbed in this portion.

According to the present invention, as described above in detail, it is possible to detect local displacement of atoms onto a material surface comprising extraction of atoms and adsorption thereof, along with the time series. It is furthermore possible to provide a method for local supply of heteroatoms on the material surface on an atomic level. By using a material locally supplied with heteroatoms, generated on the surface of the material in question thus controlled on an atomic level, it is possible to apply the same for an electron device now becoming finer in size and recording media, and to apply to an extra-large capacity storage such as an atomic-scale memory.

What is claimed is:

1. A method for locally supplying heteroatoms onto a surface of a material using a scanning tunneling microscope having a tip, the material being contained in a chamber, said method comprising:

introducing heteromolecules into the chamber;

dissociating heteromolecules into heteroatoms through a chemical reaction with a surface of the scanning tunneling microscope tip;

storing heteroatoms on the surface of the scanning tunneling microscope tip; and applying a scanning voltage to the scanning tunneling microscope tip to cause electro-evaporation of the heteroatoms stored on the surface of the scanning tunneling microscope tip; wherein electro-evaporated heteroatoms are locally adsorbed on the surface of the material.

2. The method of claim 1 further comprising:

measuring a z-piezo voltage before and after application of the scanning voltage in order to detect an increase in a distance between the scanning tunneling microscope tip and the surface of the material and thereby detect a supplement of atoms on the surface of the material.

3. A method for locally supplying heteroatoms onto a surface of a material using a scanning tunneling microscope having a tip, the material being contained in a chamber, said method comprising:

introducing heteromolecules into the chamber;

dissociating heteromolecules into heteroatoms;

storing heteroatoms on the surface of the scanning tunneling microscope tip;

evacuating the chamber;

applying a scanning voltage to the scanning tunneling microscope tip to cause electro-evaporation of the heteroatoms stored on the surface of the scanning tunneling microscope tip; wherein the electro-evaporated heteroatoms are locally adsorbed on the surface of the material.

4. The method of claim 3 further comprising:

measuring a z-piezo voltage before and after application of the scanning voltage in order to detect an increase in a distance between the scanning tunneling microscope tip and the surface of the material and thereby detect a supplement of atoms on the surface of the material.

* * * * *